Nov. 26, 1957 R. J. RAYER 2,814,701
EXPLOSION PROOF MOTOR STARTER OR CIRCUIT BREAKER ENCLOSURE
Filed July 8, 1954 3 Sheets-Sheet 2
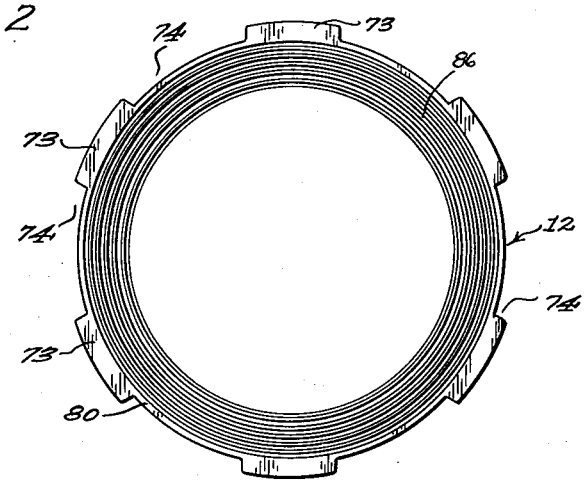
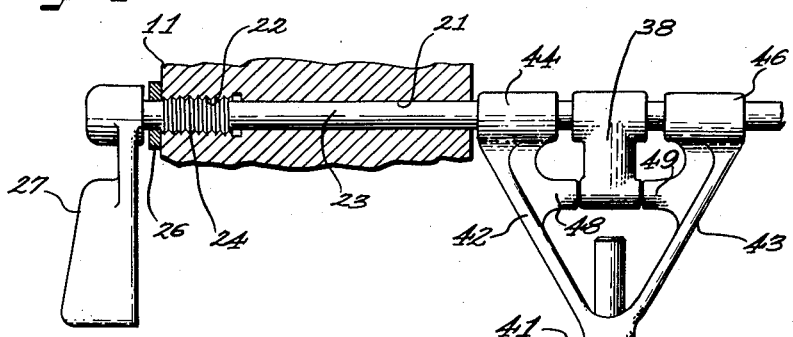
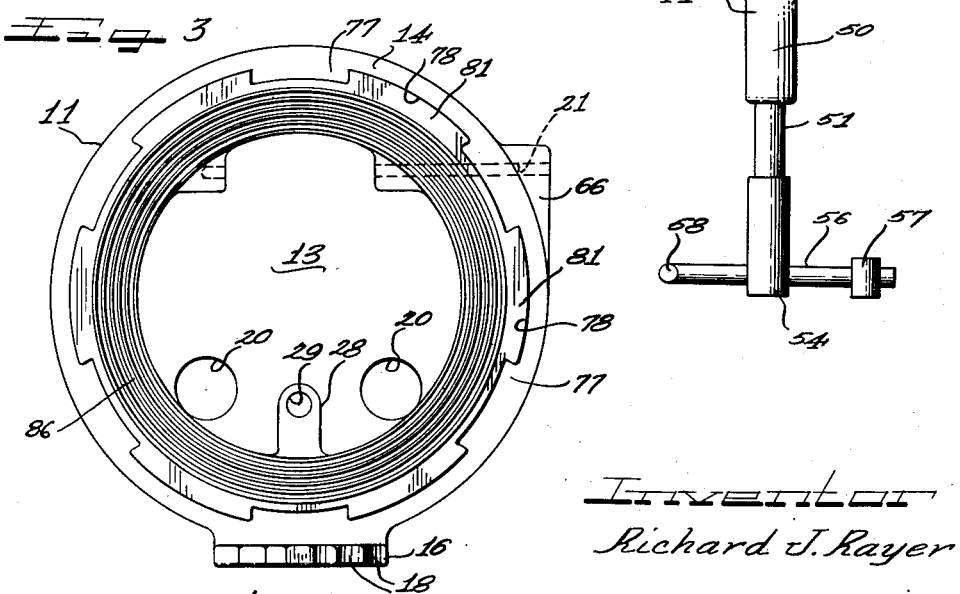
Inventor
Richard J. Rayer

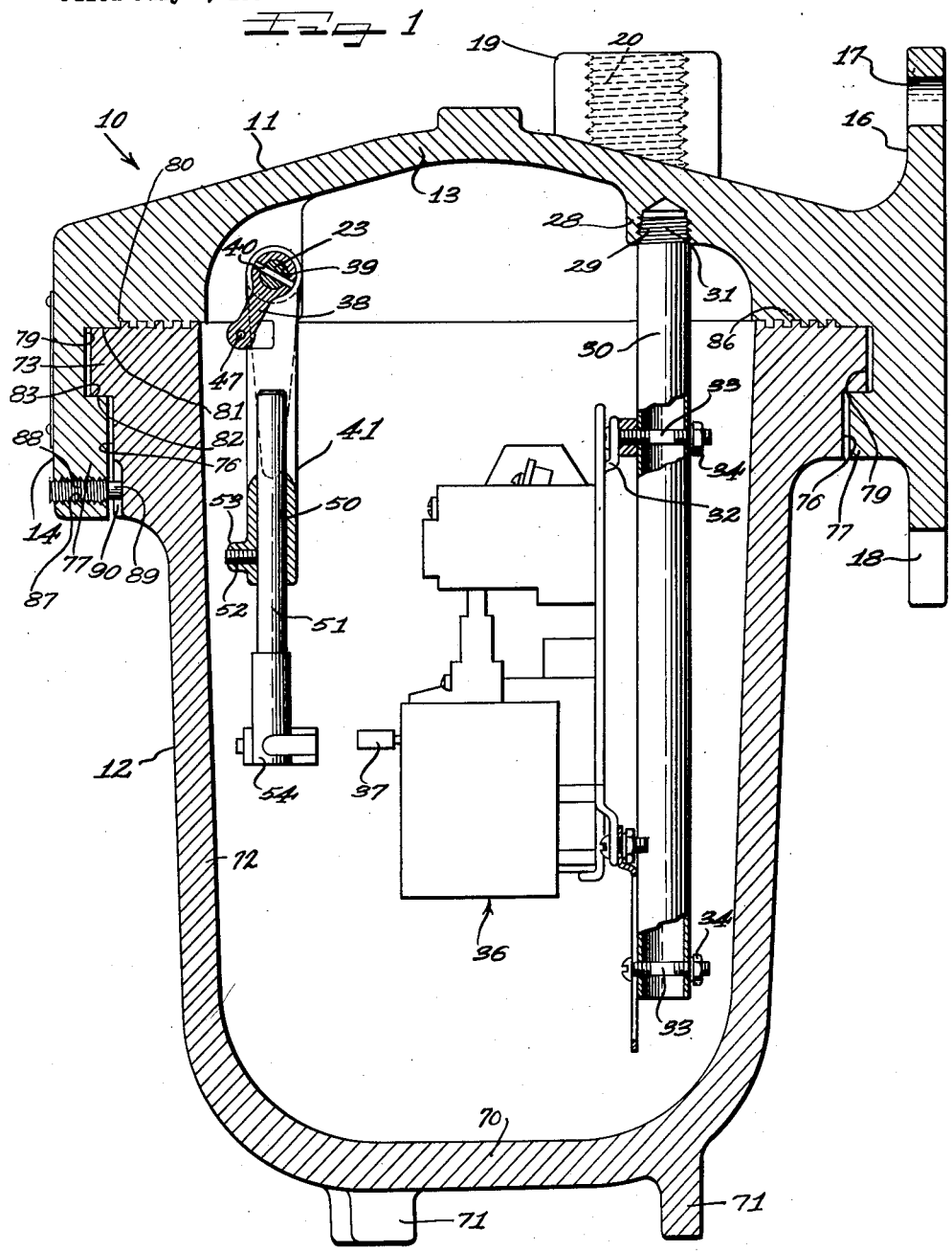

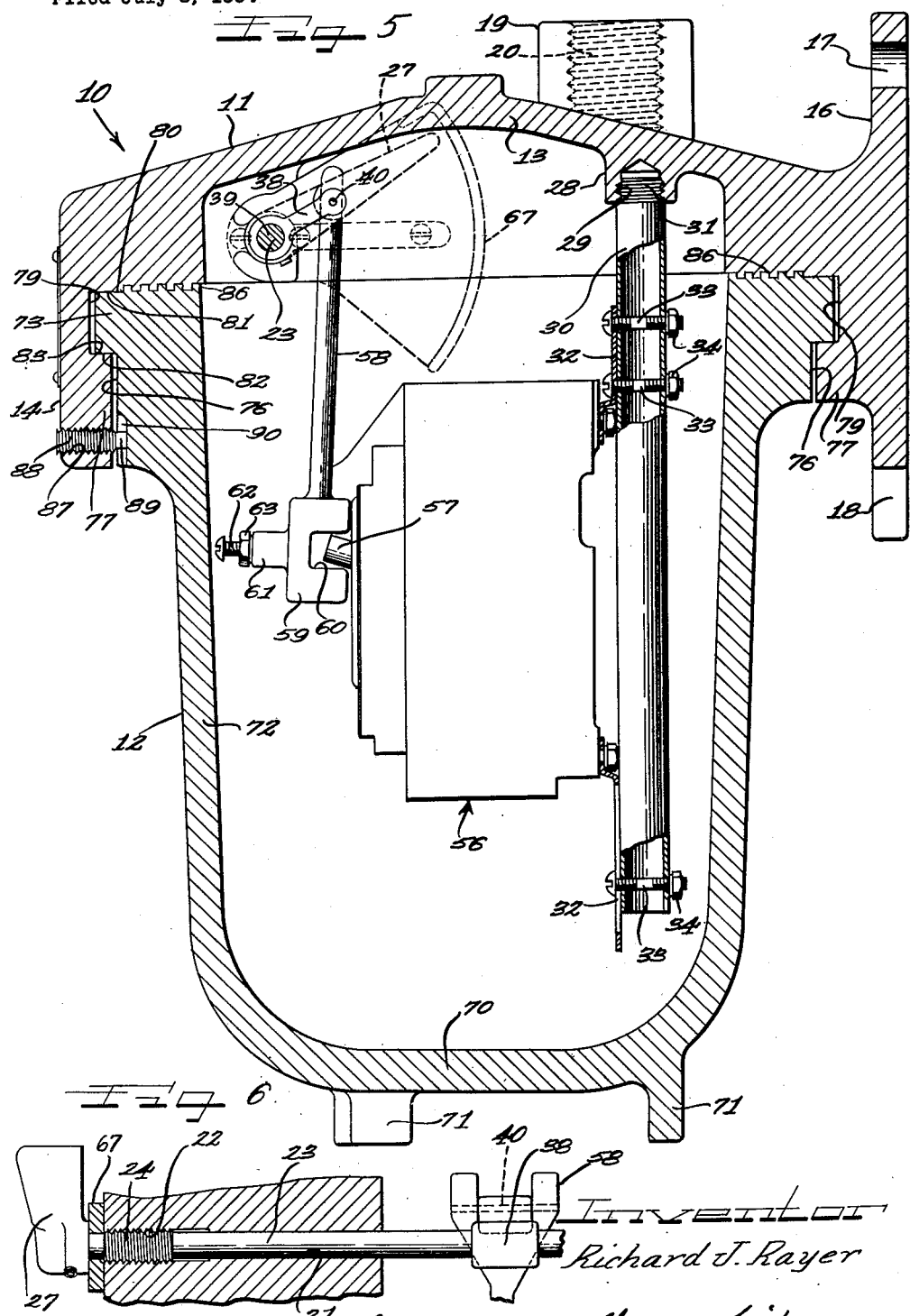

United States Patent Office 2,814,701
Patented Nov. 26, 1957

2,814,701

EXPLOSION PROOF MOTOR STARTER OR CIRCUIT BREAKER ENCLOSURE

Richard J. Rayer, Stickney, Ill., assignor to The Pyle-National Company, Chicago, Ill., a corporation of New Jersey Application July 8, 1954, Serial No. 442,014

6 Claims. (Cl. 200—168)

This invention relates generally to electrical apparatus and more particularly to an explosion proof housing for an electrical device such as a circuit breaker or motor starter having two separable enclosure members with concentrically overlapped side walls annularly and circumferentially recessed to form radially overlapped circumferentially spaced abutments movable into and out of axial alignment with one another to selectively prevent and permit axial separation of the parts, the enclosure members being further provided with abutting radial surfaces angularly offset from the side walls and together forming a restricted explosion proof path between the enclosure members when the abutments are in register with one another. The surfaces may be provided with concentric intermating ribs and grooves having sides substantially normal to the surface, thereby insuring the adequate explosion proofing of the joint with the greatest possible economy of manufacture.

Electrical apparatus is frequently employed in hazardous locations, for example, a location where concentrations of explosive mixtures occur in an operating environment either inside or outside of electrical apparatus and which is likely to be ignited by a flame or a drawn arc above ignition temperatures. Apparatus of this nature frequently includes circuit breakers and motor starters.

To adapt such equipment for use in a hazardous location, it is necessary to provide an enclosure which will virtually isolate the electrical device while permitting selective actuation of the operating parts thereof.

If a suitable enclosure is provided, it will be understood that conventionally manufactured electrical apparatus may be conveniently used, providing, of course, that the enclosure structure is suitably adapted to accommodate the various types of electrical equipment placed on the market by a large number of manufacturers active in the electrical industry today.

In adapting conventional electrical equipment to a hazardous operating environment, another serious problem is presented in affording accessibility to the enclosed device so that wiring operations and other servicing operations may be quickly and conveniently accomplished.

All of these desirable objectives are preferably developed through the utilization of explosion proofing mechanism which is rugged and which does not require great amounts of servicing skill when employed in the field. Moreover, the equipment should use a minimum of loose parts so that components of the assembly will not be lost by careless or inexperienced servicing personnel and so that virtually a foolproof safety factor will be provided insofar as explosion proofing of the electrical apparatus is concerned.

The present invention attains all of these desirable objectives in the provision of a two part enclosure wherein one of the parts constitutes a cover member attached to a support and carrying the electrical device and all actuating mechanisms therefor on a projecting support structure which positions the electrical device in a wholly accessible location. The other part of the enclosure constitutes a receptacle which is quickly and conveniently attached to the cover by a fast acting coupling arrangement, which coupling arrangement concurrently develops the added function of providing a highly efficient explosion proof path between the parts of the enclosure.

It is an object of the present invention, therefore, to provide an improved explosion proof electrical device such as a circuit breaker or a motor starter.

Another object of the present invention is to provide an explosion proof enclosure for electrical equipment which is readily adaptable for use with conventionally available electrical equipment.

A further object of the present invention is to provide explosion proof enclosure structure which utilizes a reduced number of simplified parts rugged in character, and highly efficient in actual use.

A further object of the present invention is to provide an explosion proof device wherein all of the operating mechanism is suspended from a cover member and is located in a completely and wholly accessible location beyond the limits of the cover to facilitate wiring and other servicing operations.

Many other features, advantages and additional objects of the present invention will become manifest to those versed in the art upon making reference to the detailed description which follows and the accompanying sheets of drawings in which a preferred structural embodiment of an explosion proof housing for a circuit breaker or explosion proof motor starter constructed in accordance with the principles of the present invention is shown by way of illustrative example.

On the drawings:

Figure 1 is a cross-sectional view with parts shown in elevation showing an explosion proof housing with a motor starter provided in accordance with the principles of the present invention;

Figure 2 is a plan elevational view of the receptacle member provided in accordance with the principles of the present invention;

Figure 3 is a bottom plan view of the cover member provided in accordance with the principles of the present invention;

Figure 4 is a fragmentary view illustrating additional details of construction of the actuating mechanism provided for the motor starter of Figure 1;

Figure 5 is a cross-sectional view similar to Figure 1 but showing the principles of the present invention applied to an explosion proof housing for a circuit breaker;

Figure 6 is a fragmentary view showing additional details of construction of the actuating mechanism for the circuit breaker of Figure 5.

As shown on the drawings:

In Figure 1 there is shown an explosion proof electrical device indicated generally by the reference numeral 10 and comprising two separable enclosure members including a cover member indicated generally at 11 and a receptacle indicated generally at 12.

The cover member 11 is generally cup-shaped being provided with an end wall 13 and upstanding side walls which extend circumferentially and which are indicated at 14.

At one side of the cover member 11 there is provided a bracket portion 16 having one or more apertures 17 formed therein as well as suitable relief recesses 18 to facilitate attachment of the cover member 11 in firm assembly with a support surface such as a panel board or a wall or the like.

It will be noted that in this particular embodiment, the bracket portion 16 is located on one side of the cover member 11 so that the wall 13 extends generally horizontally and the upstanding walls 14 are arranged in dependent relationship.

On the top outside surface of the cover member 11 there is provided a pair of spaced bosses 19 which are suitably apertured with threaded openings 20 to facilitate connection of the cover member with conduit members carrying electrical conductors, thereby facilitating entry of the electrical conductor into the enclosure which is partially prescribed by the cover member 11.

In one portion of the upstanding or side walls 14 of the cover member 11 there is provided a recess or a bore 21 which extends from the outside of the cover member 11 into the inside thereof and which has a partially threaded portion indicated at 22.

A shaft member 23 extends through the bore 21 and is preferably provided with at least a correspondingly threaded portion indicated at 24 to threadedly mate with the threaded portion 22 of the bore 21 thereby to form a tortuous restricted flow path along the length of the shaft 23 which will be so resistant to flame as to constitute an explosion proof joint having the requisite restrictive properties and the necessary length to cool any flame or arc passing between the shaft 23 and the cover member 11 below the ignition temperatures of explosive mixtures likely to surround the electrical device 10.

It will be understood that the threaded connection between the threaded portion 24 of the shaft 23 and the threaded portion 22 of the cover member 11 is sufficiently loose to facilitate ready rotation of the shaft. A washer 26 is provided on the shaft outside of the cover member 11 and a manual operating handle 27 is locked on the outside of the cover member 11 to the shaft 23 so that the shaft 23 may be selectively rotated by an operator.

As shown in Figures 1, 3 and 5, the inside surface of the wall 13 on the cover member 11 is particularly characterized by the formation of a boss 28 having a threaded recess 29 formed therein receiving in threaded assembly a support bracket rod 30 having a threaded portion 31 on one end thereof and having the other end thereof projecting or depending downwardly from the wall 13 beyond the lowermost extremities of the walls 14 on the cover member 11.

Support bracket means 32 are connected in firm assembly to the rod 30 by a plurality of fastening means including screw members 33 and nuts 34. For example, a bottom mounting plate may be utilized which allows the use of different sizes and shapes of electrical devices made by various manufacturers. Attached to the support bracket means 32 and located in a wholly and completely accessible position below the limits of the cover member 11 is an electrical device indicated generally at 36 and comprising, in the embodiment of Figure 1, a motor starter having a push button type reset switch, the actuating push button of which is indicated at 37.

An actuating mechanism extends between the electrical device 36 and the shaft 23, thereby to effect an operative connection between the manual handle on the outside of the enclosure and the electrical device.

In the embodiment of the motor starter shown in Figures 1 and 4, the actuating mechanism includes a generally T-shaped lever arm 38 which is recessed as at 39 to be received on the shaft 23, a pin 40 being provided to lock the lever arm member 38 to the shaft 23.

A generally Y-shaped yoke member 41 includes spaced leg members 42 and 43 each provided with recessed bosses 44 and 46 is also received on the shaft 23 and is arranged for pivotal movement. The free end of the lever arm 38 is recessed to receive a pin 47, which pin, in turn, is connected to a medial portion of the yoke legs 42 and 43 by suitable boss portions 48 and 49, respectively. Thus, the yoke member 41 will pivot in unison with the selective rotative movement of the shaft imparted thereto by the manual handle 27.

The body portion of the yoke member 41 has a generally vertically extending boss 50 receiving a rod 51 which may be vertically adjusted and positioned so that the end of the rod 51 may be selectively positioned in appropriate register with the electrical device 36, or motor starter. The rod 51 is locked in adjusted position by means of a set screw 52 carried by an appropriately recessed boss 53 formed on the body portion of the yoke member 41.

In operation, whenever the shaft 23 is rotated by operation of the manual handle 27, the yoke member 41 will pivot and will carry the rod into engagement with the reset push button 37, thereby to actuate the electrical device 36.

It will be readily appreciated by those versed in the art that a number of motor starter switch mechanisms are available on the commercial market and accordingly some flexibility is desirable insofar as the adaptability of the actuating mechanism is concerned. To obtain such flexibility, the present invention contemplates the provision of an adaptor fitting 54 which is located on the end of the actuating rod 51 and which includes a cross rod 56 having an enlarged boss portion 57 toward one end thereof and an offset end portion 58 on the other end thereof. The adaptor fitting 54 is carried in firm assembly by the rod 51 and it will be appreciated that the cross rod including the portions 57 and 58 thereof are adapted to engage the push buttons 37 of different types of motor starter switches currently in use.

In the embodiment of Figures 5 and 6, a circuit breaker is provided instead of a motor starter and, accordingly, the electrical device indicated generally at 56 may conveniently comprise a toggle switch having a toggle actuating element 57 which is generally reciprocable in a vertical direction.

In this embodiment, the lever arm 38 is connected by means of the pin 40 to the end of an actuating rod 58 depending generally into the area between the toggle switch 56 and a side wall provided by the receptacle 12.

On the end of the rod 58 there is provided an enlarged boss portion 59 having a recess 60 formed therein which is shaped to receive and confine the toggle actuating member 57. The boss portion 59 includes a reduced extension 61 suitably apertured and threaded to receive an adjustable stop member 62 having a lock nut 63. The stop member 62 by suitable adjustment is closely spaced to the side walls of the receptacle 12, thereby confining the rod for vertical reciprocable movement.

As shown in Figure 3, the cover member 11 is provided with a boss 66 to facilitate location of the manual handle 27. In the form of the invention illustrated in Figure 5, a locking plate 67 is attached to the boss 66 and provides a plate-like surface which is in the form of a segment corresponding to the general limits of pivotal movement of the manual handle 27. Suitable locking means may be provided between the handle 27 and the locking plate 67 to prevent tampering or to prevent operation of the device by unauthorized personnel.

It will be readily appreciated that all of the operating mechanism for the electrical devices thus far described is completely suspended from the cover member 11 and is located in a wholly accessible position for purposes of wiring the devices as well as other servicing purposes.

To isolate the electrical devices in explosion proof relation to the operating environment, the receptacle 12 is mounted on the cover member 11.

The receptacle 12 is a generally cup-shaped member having an end wall 70 particularly characterized by outwardly projecting lugs 71 which facilitate turning or rotative adjustment of the receptacle 12 and which also provide support legs for engaging a support surface should the receptacle 12 be removed from its assembly. The receptacle 12 further includes upstanding side walls 72 which are generally circumferential in extent and annular in form, the walls terminating in an upper wall portion of increased thickness and of lesser diameter than the walls 14 on the cover member 11, thereby to provide a partial telescoping action which results in the provision of concentrically overlapped wall portions.

As will be noted upon referring particularly to Figure 2, the receptacle 12 is provided with a plurality of circumferentially spaced radially outwardly projecting lugs 73, thereby to provide alternate lugs 73 and spaces 74.

The enlarged end portion of the receptacle 12 is also provided with a circumferentially extending recess 76 which is directly adjacent the lugs 73.

Referring now more particularly to Figure 3 in connection with Figures 1 and 5, it will be noted that the cover member 11 at the walls 14 has a plurality of circumferentially spaced radially inwardly projecting lugs 77 thereby to provide alternately spaced lugs 77 and spaces 78. Adjacent the lugs 77 on the walls 14 there is provided a circumferentially extending annular recess 79.

The width of the recess 79 in the cover member 11 is approximately the same as the width of the lugs 73 on the receptacle 12. Furthermore, there is provided on the receptacle 12 a radially extending annular surface 80 which is angularly offset approximately 90° relative to the side walls 72, which surface 80 abuts against a corresponding annular surface 81 formed on the inside of the cover member 11 and angularly offset approximately 90° from the side walls 14 of the cover member 11. Thus, the top of the lugs 73 is prescribed by the surface 80 as is the top of the recess 79. The bottom of the lugs 73 is prescribed by a shoulder 82 and the bottom of the recess 79 is prescribed by a shoulder 83. Within manufacturing tolerances, the shoulders 82 and 83 and the surfaces 80 and 81 will abut one another when the lugs 73 are received within the recess 79.

By virtue of the arrangement described, the enclosure parts, namely the cover member 11 and the receptacle 12 are axially separable because the lugs 73 projecting radially outwardly on the receptacle 12 will pass through the spaces 78 and between the circumferentially spaced inwardly projecting lugs 77 on the cover member 11. When the lugs 73 are in register with the recess 79, however, and when the lugs 77 are in register with the recess 76, the two parts 11 and 12 can be relatively rotated so that the lugs 73 and 77 will be radially overlapped. In other words, the lugs may be moved into and out of axial register with one another and form radially overlapped circumferentially spaced abutments which selectively prevent and permit axial separation of the cover member 11 and the receptacle 12.

The coupling connection afforded by the quick disconnect action of the lugs 73 and 77 affords the opportunity of wide manufacturing tolerances because the cooperating surfaces 80 and 81 form a restricted explosion proof path between the cover member 11 and the receptacle 12 at the parting line of the two parts. To further facilitate the safety characteristics of the explosion proof abutment joint, the surfaces 80 and 81 are particularly characterized by the formation of irregularities, for example, a plurality of concentrically spaced tongues and grooves are provided which intermate with one another and which together form an elongated restricted flow path of a greater length than the thickness of the joint between the cover member 11 and the receptacle 12. The tongues and grooves are indicated by the reference character 86. It will be appreciated that the concentricity of the tongues and grooves 86 accommodates relative rotative adjustment of the parts 11 and 12 without reducing the explosion proof efficiency of the joint.

In order to lock the parts 11 and 12 in assembly with the lugs 73 and 77 in register with one another, mating detent means are provided between the cover member 11 and the receptacle 12. In the form of the invention illustrated herein, a threaded recess 87 is formed in the walls 14 of the cover member 11 and carries a threaded lock pin 88 having a radially inwardly projecting end portion 89 received in a slot 90 formed in the side walls of the receptacle 12.

Although various minor structural modifications might be suggested by those versed in the art, it should be understood that I wish to embody within the scope of the patent warranted hereon all such modifications as reasonably and properly come within the scope of my contribution to the art.

I claim as my invention:

1. In an explosion proof electrical device, a cover member and a receptacle comprising two parts providing an enclosure and having inner and outer rotatably movable telescoped portions, said portions providing radial overlapped circumferentially spaced lug means movable into and out of axial alignment with one another to selectively prevent and permit axial separation of said parts, detent locking means between said inner and outer parts located to mate with one another only when said lugs are in alignment with one another to retain said parts in assembly, support means suspended from said cover member and extending into said receptacle for carrying an electrical device and an abutment surface between said parts forming a restricted flow path along the parting line of said parts and being of sufficient length to cool any flame or any arc below ignition temperatures while accommodating relative rotation between the parts.

2. In an explosion proof electrical device, a cover and a cup-shaped receptacle together providing an enclosure and together providing concentric wall portions having radially overlapped circumferentially spaced lug means movable into and out of register with one another to selectively prevent and permit axial separation of said receptacle from said cover, detent means between said cover and said receptacle mating with one another only when said lugs are in register with one another to retain said receptacle in assembly with said cover, and an abutment surface at the parting line between said cover and said receptacle forming a restricted flow path of sufficient length to cool any flame or arc below ignition temperatures while accommodating relative rotation between said parts, said cover having a mounting bracket formed thereon for attachment to a support, and a conduit opening for carrying electrical conductors to the inside of said enclosure being formed therein, and an electrical device suspended from said cover and extending into said receptacle to be in a wholly accessible location when said receptacle is removed from said cover.

3. In an explosion proof electrical device, a shallow cover part and a deep receptacle part together providing an enclosure and together providing concentric wall portions having radially overlapped circumferentially spaced lug means movable into and out of register with one another to selectively prevent and permit axial separation of said parts, and an abutment surface at the parting line between said parts forming a restricted flow path of sufficient length to cool any flame or arc below ignition temperature, said cover having a mounting bracket formed thereon for attachment to a support, a conduit opening formed in said cover part carrying electrical conductors to the inside of said enclosure, and an electrical device suspended from said cover part and extending into said receptacle to be in a wholly accessible location whenever said receptacle is removed from said cover, said cover carrying actuating means for said electrical device and having a manually engageable portion extending outside of said cover and an operating portion received inside of said receptacle and engaging said electrical device.

4. In an explosion proof electrical device as defined in claim 3, a boss on the inside of said cover part having a threaded recess formed therein, a support bracket rod threaded into said recess and extending into said receptacle part beyond the wall portions of said cover part, a support bracket connected to said rod, said electrical device attached to said support bracket, said actuating means including a bore having at least a partially threaded portion and being formed in the walls of said cover, a shaft extending between the outside and the inside of said cover part and having at least a correspondingly threaded portion mating with said threaded portion of said bore to form a tortuous explosion proof path along the length of said shaft, said manually engageable portion including a manual actuating handle connected to said shaft outside of said cover part, a lever member connected to said shaft inside of said cover part, an actuating means for said electrical device having an operative connection with said lever member to operate said electrical device when encased in said enclosure by actuation of said manual actuating handle.

5. In an explosion proof electrical device as defined in claim 4, said electrical device comprising a toggle switch having a laterally reciprocal toggle actuating member, and said actuating means more specifically comprising a rod pivotally pinned at one end to said lever and movable therewith upon rotation of said shaft for reciprocable movement in unison with said toggle actuating member, an enlarged boss formed on the other end of said rod and having formed therein a recess receiving and confining said toggle actuating member, and an adjustable stop member carried by said boss and adjustable to lie in spaced relation to one wall of said receptacle to confine the boss end of said rod for reciprocable movement between said one wall and said toggle switch.

6. In an explosion proof electrical device as defined in claim 4, said electrical device comprising a motor starter including a push button type reset switch, said actuating means comprising a yoke member pivotally mounted on said shaft and connected to the end of said lever arm for pivotal movement toward and away from said motor starter in unison with selected rotation of said shaft, and an actuating rod adjustably carried by said yoke for unison pivotal movement therewith and having a portion engaging said push button type reset switch.

References Cited in the file of this patent

UNITED STATES PATENTS

| | | |
|---|---|---|
| 2,154,821 | Olley | Apr. 18, 1939 |
| 2,156,564 | Hardage | May 2, 1939 |
| 2,545,577 | Griffin | Mar. 20, 1951 |
| 2,736,451 | Fogg | Feb. 28, 1956 |